United States Patent
Bernardi Pirini

(10) Patent No.: US 9,050,945 B2
(45) Date of Patent: Jun. 9, 2015

(54) ROTARY BRUSH CONSTRUCTION, PARTICULARLY FOR VEHICLE WASHING SYSTEMS

(71) Applicant: R&D—Research & Development S.R.L., Vicenza (IT)

(72) Inventor: Fernandino Bernardi Pirini, Vicenza (IT)

(73) Assignee: MORELITE S.R.L., Serravalle (SM)

( * ) Notice: Subject to any disclaimer, the term of this patent is extended or adjusted under 35 U.S.C. 154(b) by 0 days.

(21) Appl. No.: 13/966,180

(22) Filed: Aug. 13, 2013

(65) Prior Publication Data

US 2015/0047136 A1 Feb. 19, 2015

(51) Int. Cl.
*B60S 3/06* (2006.01)

(52) U.S. Cl.
CPC .......................................... *B60S 3/06* (2013.01)

(58) Field of Classification Search
CPC ........................................................ B60S 3/06
USPC ...................................... 15/97.3, 179, 230.16
See application file for complete search history.

(56) References Cited

U.S. PATENT DOCUMENTS

| | | | |
|---|---|---|---|
| 8,181,303 B2 * | 5/2012 | Vivyan et al. | 15/97.3 |
| 2007/0041782 A1 | 2/2007 | Jian | |

* cited by examiner

*Primary Examiner* — Randall Chin
(74) *Attorney, Agent, or Firm* — Hedman & Costigan, P.C.; James V. Costigan; Kathleen A. Costigan

(57) ABSTRACT

A motor vehicle washing system washing brush construction, having a plurality of washing brushes associated with a support tube, each washing brush having a plate body die-cut so as to form thereon a plurality of cuts providing a corresponding plurality of contoured strips joined by a central band element, with the central band element being wound on the support tube to arrange the contoured strips on both sides of the central band element, with a pair of ring elements being threaded on the support tube, on both sides of washing brush, to clamp the central band element in order to move the support tube contoured strips away from one another and cause opposite strips to move toward another, by pairs, thereby arranging the opposite strips with a substantially 90° relationship to the support tube axis.

12 Claims, 5 Drawing Sheets

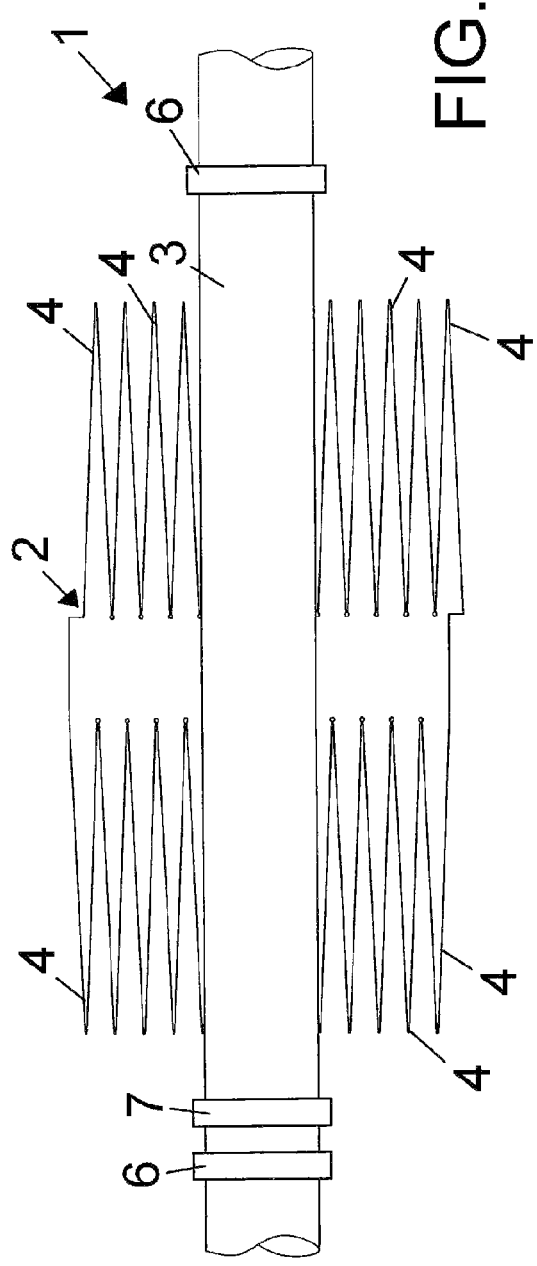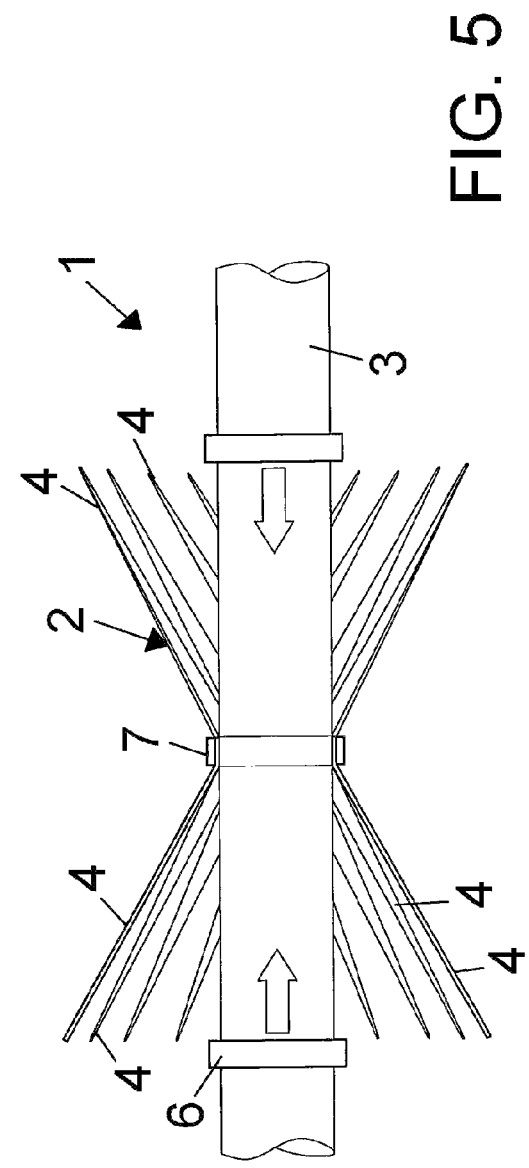

ROTARY BRUSH CONSTRUCTION, PARTICULARLY FOR VEHICLE WASHING SYSTEMS

BACKGROUND OF THE INVENTION

The present invention relates to a rotary brush construction, particularly for vehicle washing systems.

As is known, automatic motor-vehicle washing systems conventionally comprise washing brush assemblies.

Prior washing brush assemblies generally comprise a support tube coupled to a rotary element.

On the outer surface of the support tube are applied a plurality of flexible cleaning elements adjoining one another and coupled, at a respective end portion thereof, to said support tube, perpendicularly thereto.

The automatic cleaning and washing, for example of a motor-vehicle body, are carried out by rotatively driving the above disclosed washing brush assemblies, to cause the flexible elements thereof, held at a preset configuration by the centrifugal force generated by the rotary brush assemblies, to impact the vehicle body, through washing water and/or suitable washing water solutions or emulsions.

The above cleaning elements are made in different configurations, generally of polyethylene, in the form of threads or strips, fringes or straps.

Washing brushes made of brush straps usually comprise a plurality of strips or bands formed by partially cutting through the washing brush straps.

Said strips are arranged perpendicularly to the axis of the shaft thereon the washing brush straps are clamped.

Said straps are usually made of foamed material and the clamping elements for clamping said straps to their support may comprise rivets, bars and so on.

A main problem of the above construction is that of properly clamping the straps to their support to cause said straps to be arranged neither excessively spaced away from one another nor excessively near one another.

Another problem of prior strap clamping systems is that the strap assembling time is a comparatively long one.

SUMMARY OF THE INVENTION

The aim of the present invention is to provide such a rotary washing brush construction, for vehicle washing systems, adapted to overcome the above mentioned prior art drawbacks.

Within the scope of the above mentioned aim, a main object of the invention is to provide such a washing brush construction adapted to provide an optimum distribution of the washing brush straps through the support tube surface.

Yet another main object of the present invention is to provide such a washing brush construction which is very advantageous from an economic and ecologic standpoint.

Yet another object of the present invention is to provide such a washing brush construction which, differently from prior washing brush assemblies including a support element for the washing straps, using material such as plastics, aluminium or the like materials, it does not include support elements.

Yet another object of the present invention is to provide such a washing brush construction allowing a great saving in spare part shipment.

Yet another object of the present invention is to provide such a washing brush construction which may be assembled in a very quick and easy manner.

Yet another object of the present invention is to provide such a washing brush construction which washing straps may be reliably clamped thereby preventing them from deteriorating or breaking, thereby providing a long duration washing brush strap assembly.

Yet another object of the present invention is to provide such a washing brush construction which, owing to its specifically designed structural features it is very reliable and safe in operation.

According to one aspect of the present invention, the above mentioned aim and objects, as well as yet other objects, which will become more apparent hereinafter, are achieved by a motor vehicle washing brush construction, characterized in that said washing brush construction comprises a plurality of brush elements coupled to a brush element support tube.

Each said brush element comprises a plate body so die-cut as to form thereon a plurality of cuts providing a corresponding plurality of contoured strips joined to a central band element.

Said central band element is wound on the support tube thereby the contoured strips are arranged on both sides of said central band element.

A pair of ring elements, threaded on the support tube, on both sides of the brush element, clamp said central band element so as to space the contoured strips from the support tube and cause opposite strips to be moved to one another by pairs, with a substantially 90° arrangement with respect to the support tube axis.

Preferably, a central ring element encompasses the outer surface of the central band element.

BRIEF DESCRIPTION OF THE DRAWINGS

Further characteristics and advantages of the present invention will become more apparent hereinafter from the following disclosure of a preferred, though not exclusive, embodiment of the invention, which is illustrated, by way of an indicative, but not limitative, example in the accompanying drawings, where:

FIG. 4 is a side elevation view showing an operating step for winding the brush element on the support tube therefor;

FIG. 5 is a further side elevation view showing an operating step for compacting or pressing the brush element wound on its support tube;

DESCRIPTION OF THE PREFERRED EMBODIMENTS

Figure 1:
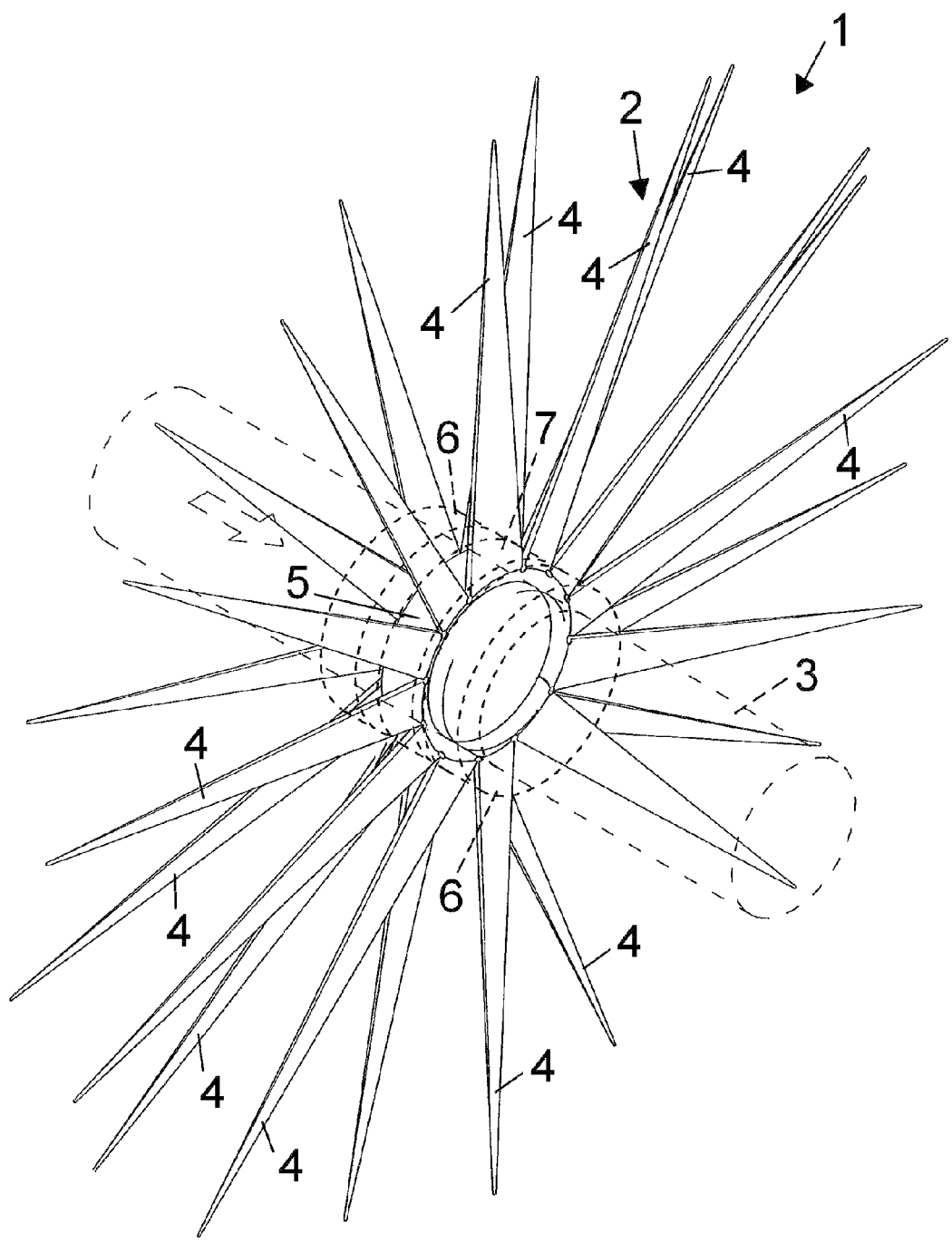
FIG. 1 is a perspective view of a component element of the vehicle washing system rotary washing brush according to the present invention.
Figure 2:
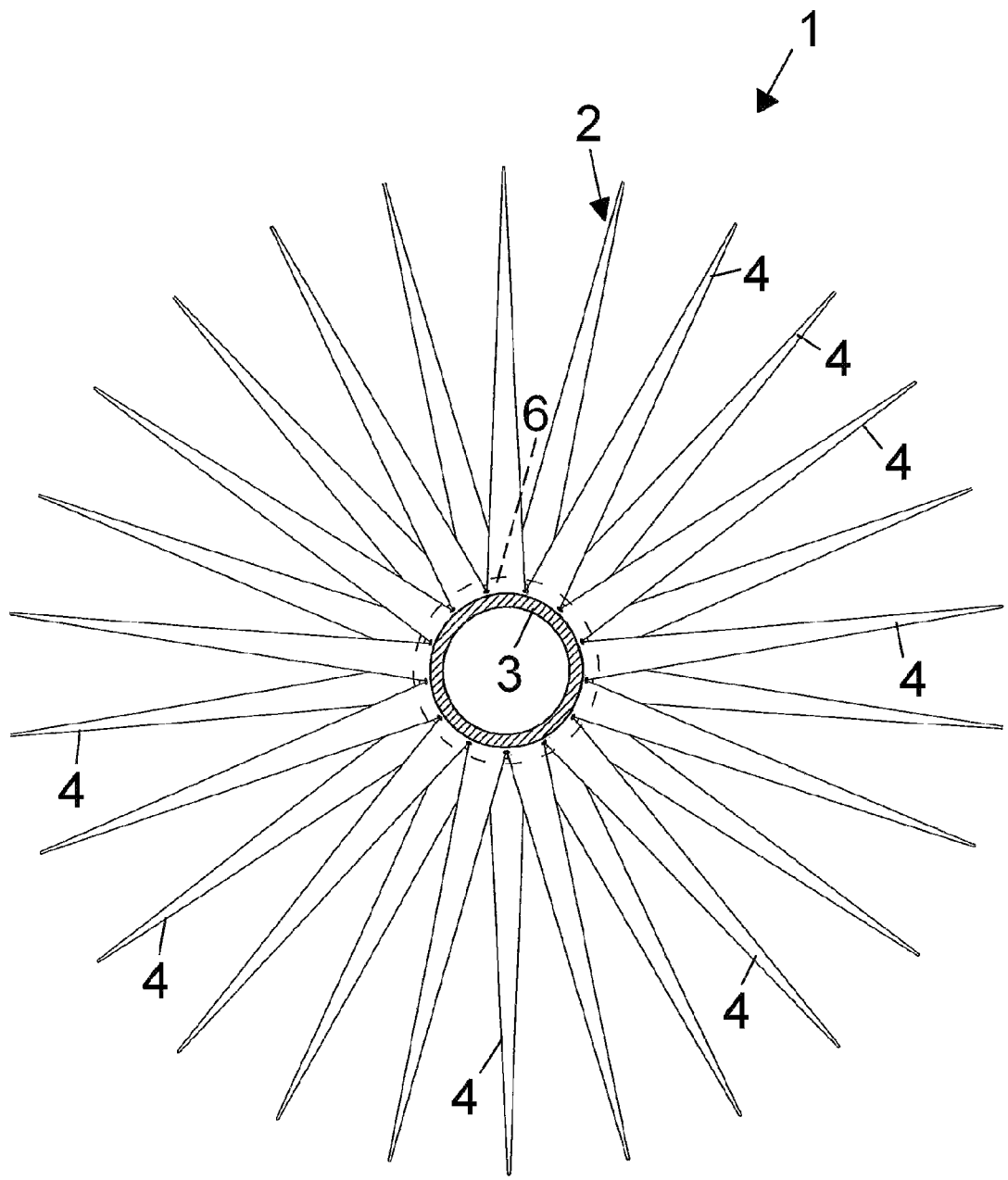
FIG. 2 is a cross-sectioned view of a washing brush element of FIG. 1.
Figure 3:
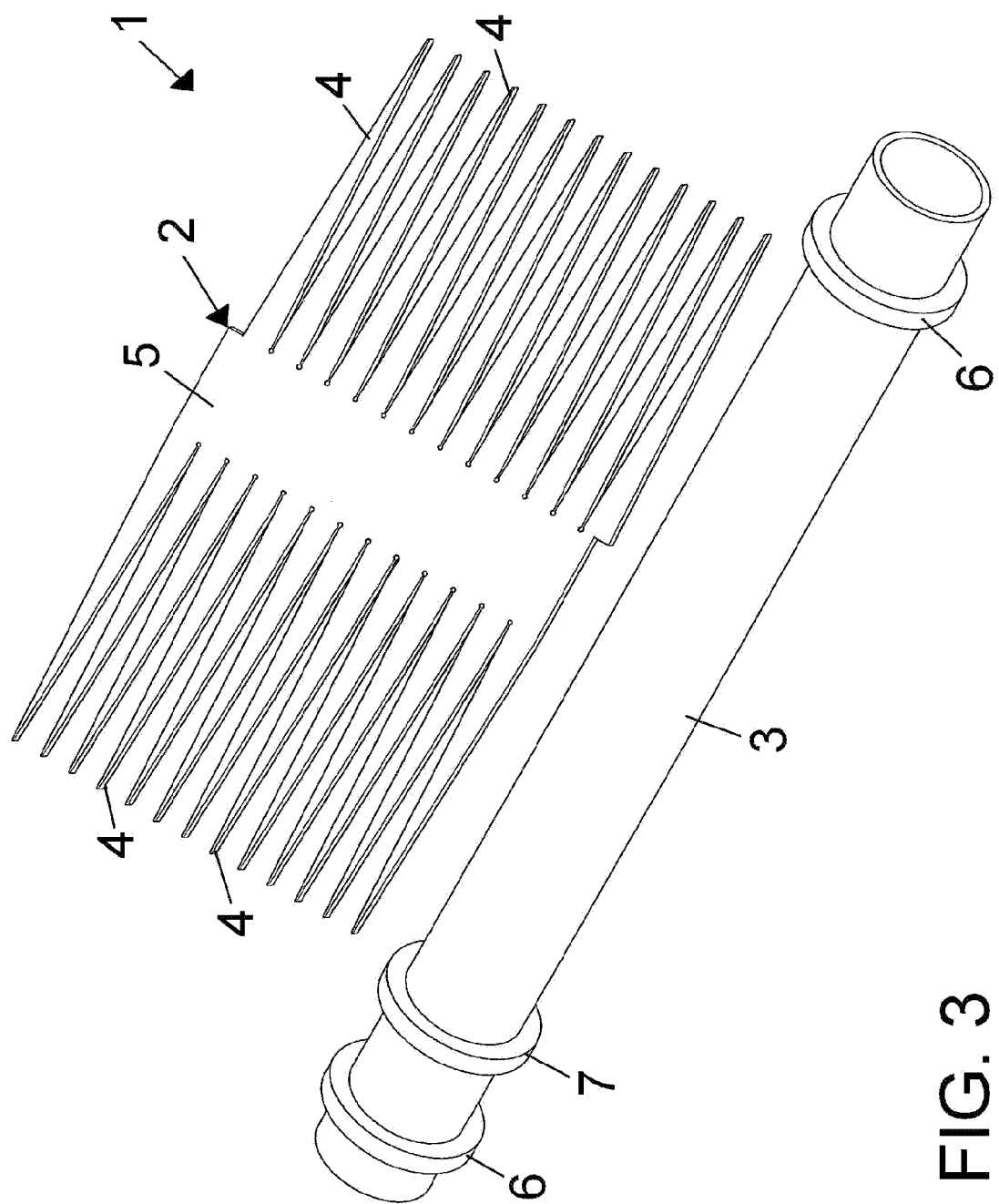
FIG. 3 is a perspective view of a support tube and a washing brush element, before assembling the latter.

With reference to the number references of the above mentioned figures, the vehicle washing system washing brush construction according to the present invention, which has been generally indicated with reference number 1, comprises a plurality of washing brush elements 2 associated with a support tube 3 which, in turn, is mounted on suitable rotary support elements, not shown in the figures.

Each said washing brush element 2 comprises a plate-like body which may be advantageously made of a closed cell foamed plastic or a felt material.

Said plate-like body is so die-cut as to form thereon a plurality of cuts providing a corresponding plurality of contoured strips 4 joined to a central band element 5.

Said contoured strips 4 have preferably a triangular configuration.

The cut of said strips is, preferably though not necessarily, a tipped cut.

Said central band element 5 is wound on the tube 3 as to cause said contoured strips to be arranged on both sides of the central band element 5, as shown in FIG. 4.

Figure 6:
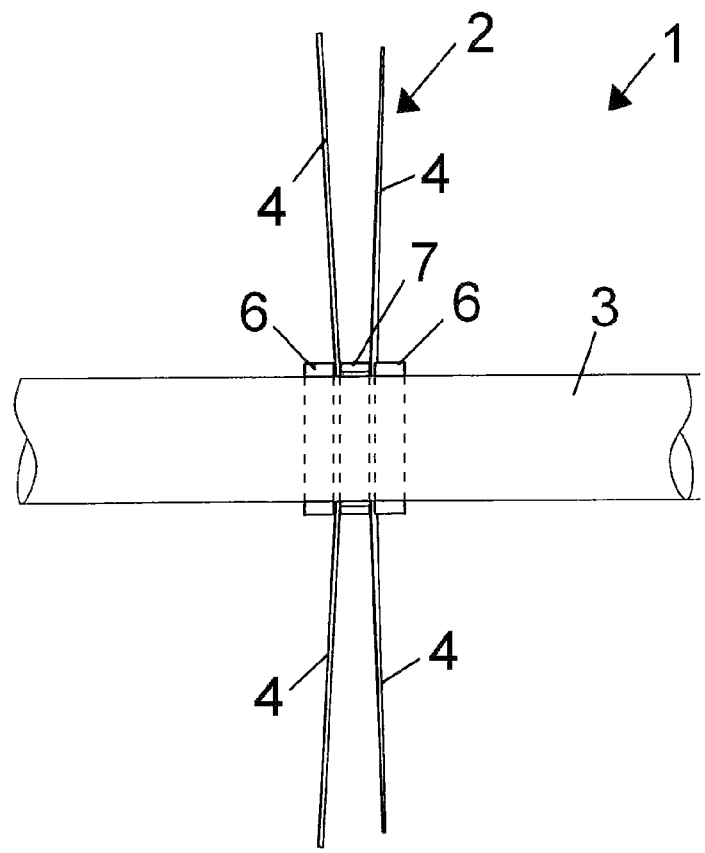
FIG. 6 is yet another side elevation view showing the brush element mounted on its support tube at a ready for use position.

In assembling the washing brush, a pair of clamping ring elements 6 are applied on the support tube 3, on both sides of the brush element, thereby clamping or pinching said central band element 5, so as to move away the contoured strips 4 from the support tube and cause opposite strips 4 to move to one another, by pairs, thereby arranging the latter with a substantially 90° arrangement with respect to the axis of the tube 3, as shown in FIG. 6.

Then, by assembling further brush elements 2, the washing brush construction 1 is completed, said washing brush construction comprising a plurality of washing brush elements applied to the support tube 3 and spaced as desired from one another.

Figure 7:
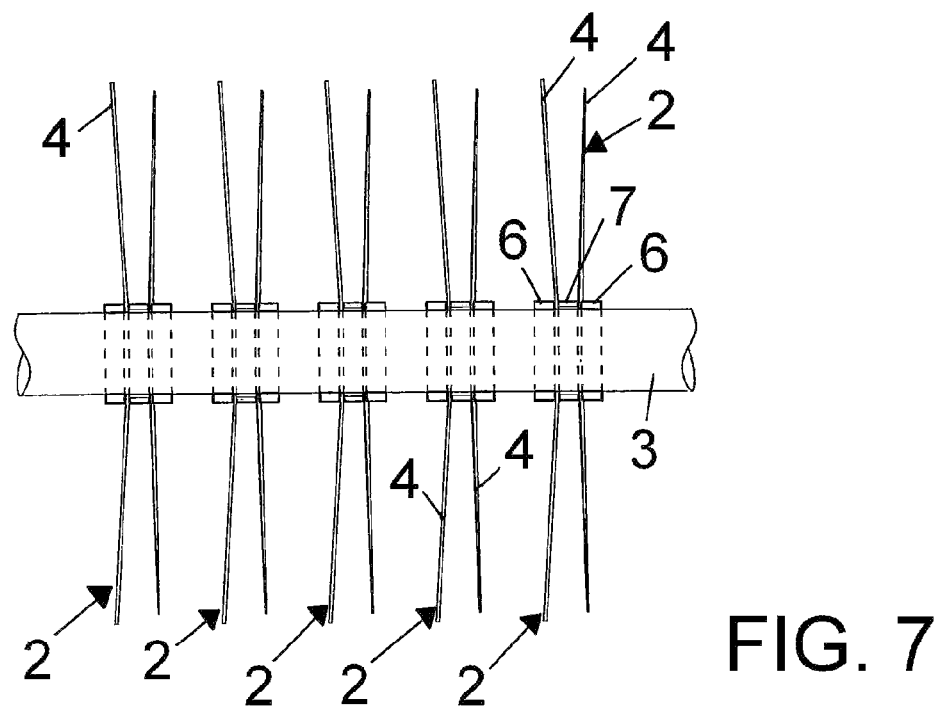
FIG. 7 is yet another elevation view showing the washing brush construction in a use condition thereof with a plurality of washing brush elements mounted on the support tube.

FIG. 7 shows an embodiment of the rotary washing brush construction 1, wherein the washing brush elements are spaced from one another.

In this connection it should be apparent that the spacing of the washing brush elements 2 may be easily changed by merely arranging the ring elements 6 at a different spacing from one another.

As above disclosed, the strips are advantageously cut by an asymmetrical type of cut.

Accordingly, upon assembling the brush element 2 on the support tube with the strips 4 joined to a central band element 5, said strips 4 will open with a spoke-wheel arrangement, because of the provision of ring elements 6 sliding thereunder.

The strips that make up the "spokes" will precisely fall in a space between opposite strips because the strips 4 are die-cut on opposite sides of a plate like body as shown in FIG .4 so that when assembled, the strips 4 which form the spokes are spaced so that a space is formed between opposite strips 4. This provides a strategically quilted side surface to improve the contact tip distribution, without empty spaces therebetween.

In such a construction, three ring elements are preferably used, which are: a central ring element 7, for holding the spoke band element clamped to the tube, and two other side ring elements 6, to open said spoke band element as an umbrella, from the top and bottom portions thereof.

Said two side ring elements 6 also operate as spacer elements to position the washing brush elements at the edge of the washing brush.

Thus, it is possible to properly control the washing brush density, by including more or less washing spokes in different operating areas.

The spacing between two adjoining ring elements, of two adjoining washing brush elements, may be changed to differently compact with one another the washing brush elements.

It has been found that the invention fully achieves the intended aim and objects.

In fact, the invention has provided a rotary washing brush construction providing an optimum distribution of the strap elements through the support tube surface, while facilitating the washing brush assembling operation.

Moreover, the inventive washing brush construction provides a firm and reliable clamping of the washing straps, of high duration, while preventing said straps from being deteriorated or prematurely broken.

Moreover, the invention also provides very important economic and ecologic advantages.

In fact, conventional washing brush assemblies include a support for the washing straps, thereby several different materials, such as plastic, aluminium or the like must be used, whereas, in the inventive washing brush, the straps are mounted on their support tube without requiring additional supports.

Furthermore, the inventive washing brush components may be replaced in the same manner thereby, by merely causing the original ring elements to slip, arranging new straps in replacement of the worn ones and reassembling the just removed ring elements.

Moreover, the present washing brush construction has small costs, both with respect to its assembling and operation.

Yet another great saving is achieved in the spare part shipment, since the spare parts comprise only the washing straps, arranged in a stacked relationship, thereby occupying a third of the volume occupied by prior preassembled bristle prior elements.

In practicing the invention, the used materials, as well as the contingent size and shapes, can be any, according to requirements.

The invention claimed is:

1. A motor vehicle washing system rotary washing brush construction, comprising a plurality of washing brush elements associated with a support tube, each said washing brush element comprising a plate body so die-cut as to form thereon a plurality of cuts providing a corresponding plurality of contoured strips joined by a central band element, characterized in that said central band element is wound on said support tube as to arrange said contoured strips on both sides of said central band element, with a pair of ring elements being threaded on said support tube, on both sides of said washing brush element to clamp said central band element so as to move the support tube contoured strips away from one another and cause opposite strips to move to one another, by pairs, thereby arranging said opposite strips with a substantially 90° relationship with respect to a tube axis.

2. The motor vehicle washing system rotary brush construction, according to claim 1, characterized in that said motor vehicle rotary brush construction comprises a central ring element encompassing an outer surface of said central band element.

3. The motor vehicle washing system rotary brush construction, according to claim 1, characterized in that said plate body is made of a closed cell foamed plastic or felt material.

4. The motor vehicle washing system rotary brush construction, according to claim 1, characterized in that said washing brush construction comprises a plurality of brush elements applied to said support tube and spaced at different spacings from one another.

5. The motor vehicle washing system rotary brush construction, according to claim 1, characterized in that said strips have a triangular shape.

6. The motor vehicle washing system rotary brush construction, according to claim 1, characterized in that said strip cuts are tipped cuts.

7. The motor vehicle washing system rotary brush construction, according to claim 1, characterized in that said washing brush construction comprises a plurality of washing brush elements applied to said support tube and spaced from one another at a set spacing.

8. The motor vehicle washing system rotary brush construction, according to claim 1, characterized in that said washing brush elements are spaced from one another.

9. The motor vehicle washing system rotary brush construction, according to claim 8, characterized in that the spacing of said washing brush elements is changed by arranging said ring elements at a different spacing from one another.

10. The motor vehicle washing system rotary brush construction, according to claim 1, characterized in that, when said washing brush element is mounted on said support tube, said strips open in a spoke width arrangement by sliding said pair of ring elements thereunder.

11. The motor vehicle washing system rotary brush construction, according to claim 10, characterized in that the strips have contact tips and that the strips open in a spoke width arrangement in one portion precisely fall in a space between opposite strips, thereby providing a strategically quilted side surface to optimally distribute contact tips without empty spaces therebetween.

12. The motor vehicle washing system rotary brush construction, according to claim 1, characterized in that said washing brush construction comprises three ring elements, a central ring element, to hold said contoured strips firmly coupled to said support tube and two side ring elements to open said contoured strips as an umbrella from above and under said contoured strips, said two side ring elements also operating as spacer elements to position the washing brush elements at an edge of the washing brush.

* * * * *